United States Patent [19]

Slat

[11] Patent Number: 4,573,596
[45] Date of Patent: Mar. 4, 1986

[54] PLASTIC CONTAINER WITH VAPOR BARRIER

[75] Inventor: William A. Slat, Brooklyn, Mich.

[73] Assignee: Plastipak Packaging, Inc., Plymouth, Mich.

[21] Appl. No.: 750,065

[22] Filed: Jun. 28, 1985

Related U.S. Application Data

[63] Continuation of Ser. No. 433,536, Oct. 8, 1983, abandoned.

[51] Int. Cl.⁴ ............................................. B65D 23/08
[52] U.S. Cl. .................................... 215/12 R; 220/450
[58] Field of Search ...................... 215/12 R; 220/450

[56] References Cited

U.S. PATENT DOCUMENTS

| | | | |
|---|---|---|---|
| 4,183,441 | 1/1980 | Erlandson | 215/12 R |
| 4,210,259 | 7/1980 | Schrecker | 206/455 |
| 4,219,124 | 8/1980 | Amberg | 215/12 R |
| 4,315,573 | 2/1982 | Bradley et al. | 215/12 R |
| 4,342,399 | 8/1982 | Stirling | 215/12 R |
| 4,457,450 | 7/1984 | Smith et al. | 220/455 |

Primary Examiner—Joseph Man-Fu Moy
Attorney, Agent, or Firm—Brooks & Kushman

[57] ABSTRACT

A container molded from a fluid permeable plastic material wherein the wall of the molded container is made resistant to fluid transmission. A label has a barrier-coating resistant to fluid transmission and also has a heat-sensitive adhesive surface. The label is applied to the container during the molding of the container. The label is placed in the mold and then plastic heated to a temperature sufficient to activate the adhesive is introduced into the mold and forced against the wall of the mold and also against the label to form the container and at the same time to cause the label to adhere to the container thus formed. The formed container has a side wall with abruptly curved portions at upper, lower, and spaced side edges of the label to provide the container with a generally continuous outer surface at the junctions of the label edges with the side wall. The label becomes an integral part of the container and resists fluid transmission through the label area.

5 Claims, 8 Drawing Figures coating. Over the PVDC coating, there is applied a heat-sensitive adhesive 39 which in the present instance is a gel lacquer type heat seal coating which becomes sufficiently tacky to adhere or heat seal at about 160° F. A lacquer coat 40 usually covers the printing on the exposed or front side of the label.

In accordance with the method of this invention, the labels L are held by the vacuum cups 36 with the adhesive coated sides facing inwardly with respect to the mold, that is away from the walls of the mold cavity, and the loading mechanism is raised to the upper position of FIG. 1 between the open mold sections 28. The arms 34 are extended to press the labels against the walls of the mold cavity 28 where they are held by vacuum applied through vacuum mold passages 30. Suction in the vacuum cups is removed to release the labels after which arms 34 are retracted to clear the mold sections and the loading mechanism is moved to its lower position beneath the mold sections.

The preform is preheated to a temperature greater than the tackifying temperature of the adhesive (which as stated above in the present instance is about 160° F.) preferably in a range from 170° F. to 260° F., and the heated preform is placed in the mold (FIG. 2) and the mold closed. FIG. 3 shows the mold closed and the preform starting to blow by compressed air. The preform is axially stretched and blown by the compressed air, forcing and pressing the plastic against the wall of the mold to form the container or bottle 10 and also against the labels. The hot plastic in contact with the adhesive surface of the labels causes the adhesive to tackify and bond or heat seal to the outside wall of the container. The labels thus become in effect an integral part of the container without any voids or air pockets. Since the labels become permanent, integral parts of the container, the label area of the container wall may be of reduced thickness, resulting in overall weight reduction. The thicker portions of the container above and below the labels (FIG. 6) are not protected by a barrier coating but have a lower permeability rate because of the greater thickness. Also peeling and blistering of the labels is avoided.

As illustrated in FIGS. 6 and 6a, the blown container 10 has its side wall 12 provided with abruptly curved portions 42, 44, and 46 respectively adjacent the upper label edge LU, the lower label edge LL, and the spaced side label edges LS. These abruptly curved portions 42, 44, and 46 of the container side wall 12 provide the container with a generally continuous or flush outer surface at the junctions of the label edges LU, LL, and LS with the side wall.

By employing barrier-coated labels (that is labels having a coating resistant to fluid permeation) with a special heat-sensitive adhesive in an in-mold labeling process, separation of the barrier coating from the bottle is totally eliminated. Likewise blistering caused by transmission of gas or liquid through the container wall is eliminated. Accordingly, shelf life of the filled containers is improved. Moreover, separate applying and drying of the barrier coating is obviated.

While stretch blow molding is used in the method described, other molding techniques such as normal blow molding, injection blow molding and injection molding may be employed.

The fact that the label becomes in effect an integral part of the container is illustrated in FIGS. 6 and 6a wherein the label is shown flush with the outer surface of the side wall portion of the container.

I claim:

1. A container comprising: a side wall; an upper neck that extends upwardly from the side wall; a bottom that ends downwardly from the side wall to close the container; a label of a uniform thickness on the side wall of the container; said label extending partially around the side wall and having side edges spaced from each other; said label also having an upper edge located below the neck of the container and a lower edge located above the bottom of the container; said container side wall having abruptly curved portions adjacent the edges of the label to provide the container with a generally continuous outer surface at the junctions of the label edges with the side wall; said label including a barrier for resisting the transmission of fluids through the container side wall; and a heat sensitive adhesive that secures the label to the container side wall.

2. A container as in claim 1 which includes a pair of the labels located on the container side wall on opposite sides of the container.

3. A container comprising: a side wall; an upper neck that extends upwardly from the side wall; a bottom that extends downwardly from the side wall to close the container; a label of a uniform thickness on the side wall of the container; said label extending partially around the side wall and having side edges spaced from each other; said label also having an upper edge located below the neck of the container and a lower edge located above the bottom of the container; said container side wall having abruptly curved portions adjacent the edges of the label to provide the container with a generally continuous outer surface at the junctions of the label edges with the side wall; said label including a barrier for resisting the transmission of fluids through the container side wall; and a heat sensitive adhesive that secures the label to the container side wall.

4. A container comprising: a side wall; an upper neck that extends upwardly from the side wall; a bottom that extends downwardly from the side wall to close the container; a paper strip label of a uniform thickness on the side wall of the container; said paper strip label having an inner surface that faces the side wall as well as an outer surface that faces outwardly away from the side wall; said paper strip label extending partially around the side wall and having side edges spaced from each other; said paper strip label also having an upper edge located below the neck of the container and a lower edge located above the bottom of the container; said container side wall having abruptly curved portions adjacent the edges of the paper strip label to provide the container with a generally continuous outer surface at the junctions of the label edges with the side wall; a barrier coating of polyvinylidene cloride on the inner surface of the paper strip label for resisting the transmission of fluids through the container side wall; a heat sensitive adhesive that secures the paper strip label to the container side wall; and a lacquer coating applied to the outer surface of the paper strip label on the opposite side thereof as the polyvinylidene cloride barrier coating.

5. A container as in claim 4 which includes a pair of the labels located on the container side wall on opposite sides of the container.

* * * * *

PLASTIC CONTAINER WITH VAPOR BARRIER

This application is a continuation of application Ser. No. 433,536, filed Oct. 8, 1983 now abandoned.

This invention relates generally to fluid containers, and refers more particularly to plastic containers having improved resistance to the transmission of fluids through the wall of the container and to a method of making the same.

BACKGROUND AND SUMMARY OF THE INVENTION

One serious drawback to many plastics used in the manufacture of fluid containers is that they are gas and liquid permeable so that the gas and/or liquid contents can escape through the container wall. Different plastics have different permeability rates, but those presently being used in the manufacture of containers for liquids such as carbonated beverages and the like all share this problem.

One approach to the problem has been to coat plastic containers with a "barrier" material such as polyvinylidene chloride (PVDC). However, if the coating is applied on the outside of the container, the fluid contents can still penetrate the container wall and will often produce blisters in the coating. As a result, the container takes on an unsightly appearance, and, of course, there is a loss of some of the fluid contents ($CO_2$ in the case of carbonated beverages). Outside coating by the "dip method" has also been found to be expensive in terms of time and labor, and to result in an uneven distribution of coating.

On the other hand, inside coating, while it avoids blistering resulting from internal fluid pressure, is a difficult and costly procedure requiring increased drying time. Moreover, any flaking of the coating will contaminate the contents.

In accordance with the specific embodiment described hereinafter, a label or the like is applied to a plastic container by a process known as In-Mold Labeling. The label is resistant to fluid transmission and has a heat-sensitive adhesive surface. The label is placed in the mold; then plastic heated to a temperature sufficient to activate the adhesive is introduced into the mold and forced against the wall of the mold and against the label to form the container and to cause the label to adhere to the container thus formed. The label for all practical purposes becomes an integral part of the container so that it will not blister or peel away, and resists fluid transmission through the label area. The label area usually has a relatively thin wall compared to other parts of the container and thus the portion of the container having the least resistance to gas and liquid transmission is protected.

These and other objects and features of the invention will become more apparent as the following description proceeds, especially when considered with the accompanying drawings.

DETAILED DESCRIPTION

Figure 1:
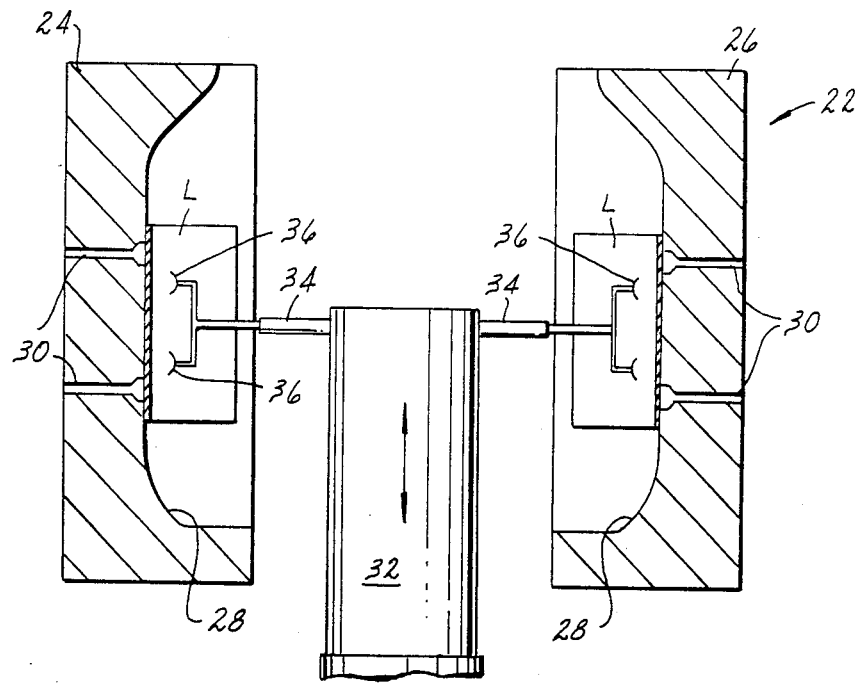
FIG. 1 is an elevational view of an open blow mold, showing labels or the like being applied to the mold sections in accordance with an initial step in the method of the present invention.
Figure 2:
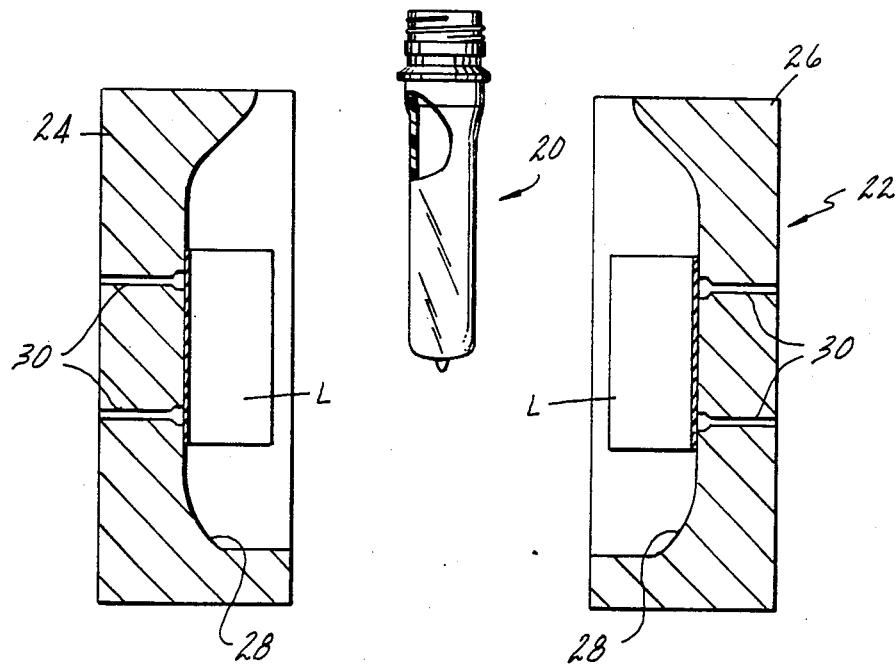
FIG. 2 shows a standard stretch blow mold preform moved into blowing position between the mold sections in accordance with a subsequent step in the method.
Figure 3:
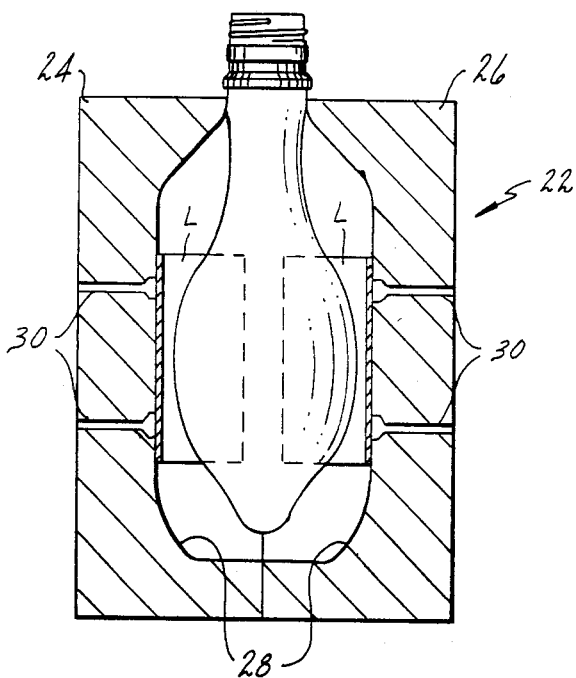
FIG. 3 shows the mold closed and the preform starting to blow.
Figure 4:
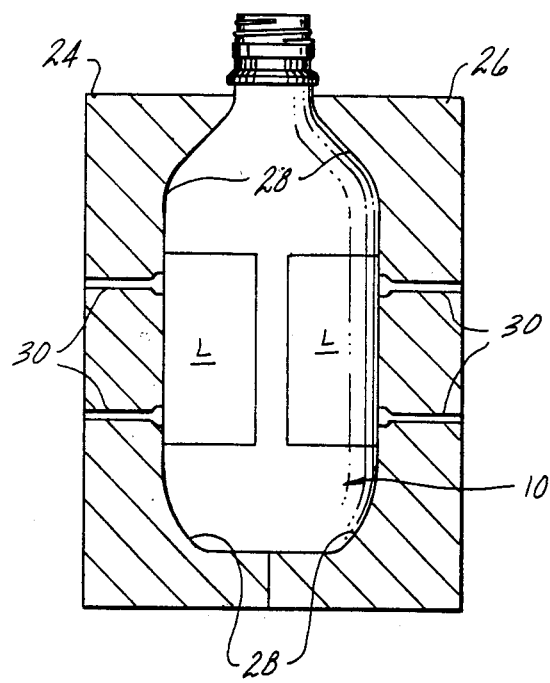
FIG. 4 shows the resulting container or bottle filling out the mold.
Figure 5:
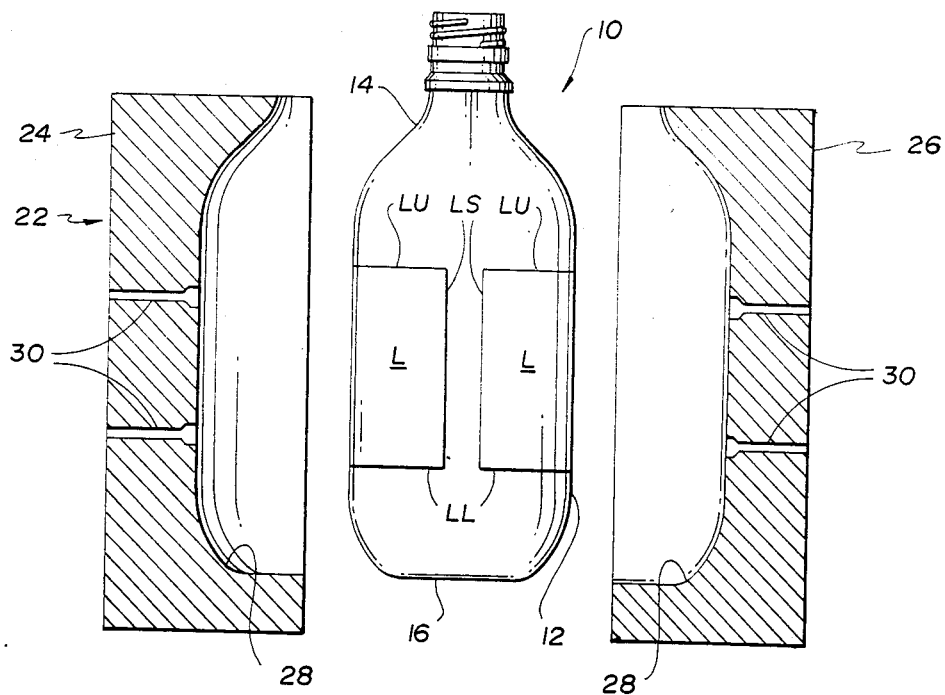
FIG. 5 shows the container or bottle being removed from the open mold.
Figure 6:
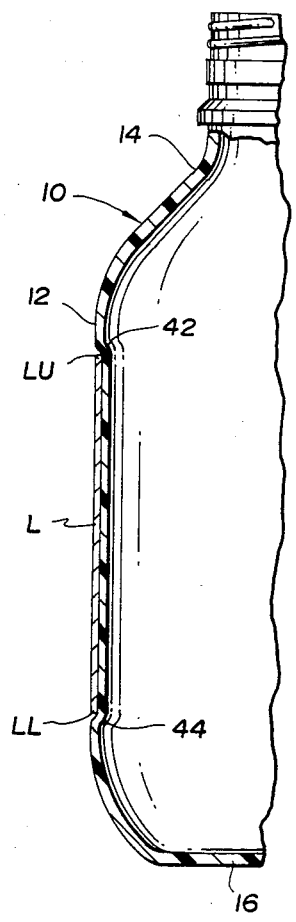
FIG. 6 is a partial sectional view taken along a vertical plane of the container or bottle with an applied label.
Figure 7:
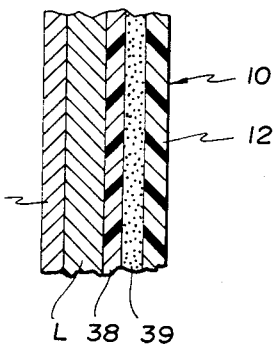
FIG. 7 is a sectional fragmentary detail of the label.
Figure 6A:
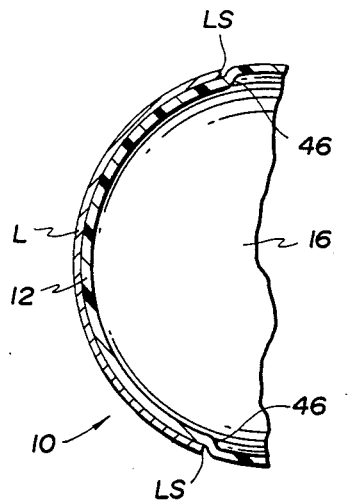
FIG. 6a is a partial sectional view taken along a horizontal plane of the container or bottle with an applied label.

Referring now more particularly to the drawings, the container or bottle 10 of this invention is made of a suitable plastic material such, for example, as polyethylene terephthalate (PET) or high density polyethylene. Such materials, unfortunately, are fluid permeable so that the gas and/or liquid contents of a container made therefrom gradually escape through the container wall. The container has a cylindrical side wall 12, an upper neck 14 that extends upwardly from the side wall, and a bottom 16. A pair of labels L of a uniform thickness are applied to the outer surface of the side wall on opposite sides of the bottle. Each label extends partially around the side wall 12 and has side edges LS spaced from each other as best shown in FIG. 6a. As shown in FIG. 6, each label L also has an upper edge LU located below the neck 14 of the container and also has a lower edge LL located above the bottom of the container. The wall section of the bottle is relatively thin in the portion to which the labels are applied in comparison to the remaining portions of the bottle above and below the label area, as clearly seen in FIG. 6.

The bottle is made from a standard stretch blow mold preform 20 which is made in a conventional manner in an injection molding operation. The preform 20 is preheated and placed in a blow mold indicated generally at 22 where it is stretched axially and then blown by compressed air to fill out the blow mold so that the resulting article takes the exact shape desired in the blow mold, as described in more detail hereinafter.

The blow mold 22 comprises two half mold sections 24 and 26, each having a mold cavity 28 corresponding in configuration to one half of the bottle. Vacuum passages 30 in the two mold sections open into the cavity 28 in the side wall forming portions thereof, where the labels are applied. A label loading mechanism 32 has arms 34 provided with vacuum passages leading to vacuum cups 36 on the ends of the arms. The label loading mechanism 32 is movable vertically as indicated by the arrows from the upper position shown in the drawings in which it extends between the open mold sections to a lower position beneath the mold sections. The arms 34 are shown in their extended positions, but may be retracted inwardly to clear the mold sections when the loading mechanism is retracted to its lower position. Suitable means, not shown, are employed to apply vacuum when desired to the vacuum passages 30 of the two mold sections.

Each label is a simple flexible strip, usually of paper, coated on the back side with a thin film or coating 38 of a suitable "barrier" material which is highly resistant to the transmission of liquids and gases. One coating material found to be highly suitable for the purpose is polyvinylidene chloride (PVDC). The coating 38 may be applied in liquid form by wiping, spraying, and roll

UNITED STATES PATENT AND TRADEMARK OFFICE
CERTIFICATE OF CORRECTION

PATENT NO. : 4,573,596

DATED : March 4, 1986

INVENTOR(S) : William A. Slat

It is certified that error appears in the above-identified patent and that said Letters Patent is hereby corrected as shown below:

Column 4, line 6, "ends" should read -- extends --.

Column 4, Claim 3 should appear as shown below:

3. A container as in claim 1 wherein the label comprises a paper strip having an inner surface at which the barrier is located, said barrier including a coating of polyvinylidene cloride, the heat sensitive adhesive being located between the polyvinylidene cloride barrier coating and the container side wall, and a lacquer coating applied to the outer surface of the paper strip label on the opposite side thereof as the polyvinylidene cloride barrier coating.

Signed and Sealed this

Third Day of March, 1987

Attest:

DONALD J. QUIGG

Attesting Officer

Commissioner of Patents and Trademarks